United States Patent Office  2,903,399
Patented Sept. 8, 1959

2,903,399

PROCESS FOR THE PRODUCTION OF ACIDIFIED MALT

Thomas Robert Dixon, near Royston, England, assignor to The Enzymic Malt Company Limited, London, England No Drawing. Application June 21, 1955
Serial No. 517,067

4 Claims. (Cl. 195—70)

This invention relates to the production of acidified malt. The acidification of malt was described in British specification No. 339,047, in which was disclosed a process in which the cereal is treated with a solution of an organic acid such as lactic acid as soon as the testa is broken by natural growth, or after germination, in order to stimulate and accelerate the action of the enzymes of the cereal.

This process was developed and improved, as described in British patent specification No. 582,423, by the use of biological lactic acid, whereby a measure of continuity was introduced, the same acid being employed for several successive steepings, so long as the acid taken up by the cereal was replenished. This continuity was, however, limited to only a few steepings, for reasons to be explained hereinafter.

In the semi-continuous process described in British patent specification No. 582,423, the term "bioligcal lactic acid" was used to describe acid derived from the carbohydrate parts of cereals by the action of bacteria. When the cereals are ground and mashed with water at a suitable temperature they provide the nourishment required by the bacteria for the formation of lactic acid. Any cereals may be used, whether malted or unmalted, provided that a proportion of malted material is used to ensure conversion of the starch of the unmalted material.

It was stated in British patent specification No. 582,423 that when green malt, that is, steeped grain in which the embryo has developed rootlets in the usual way, is steeped in a solution of lactic acid, about 25% of the acid solution passes into the interior of the grain, and at the same time the degree of acidity of the residual solution increases considerably, because the bacteria present feed on the carbohydrates of the green malt. If the residual solution is used for the steeping of the next batch of green malt, the acidity is further increased in the same way. To use the residual solution for a second time, however, it is necessary to replace the approximately 25% of the lactic acid solution that has passed into the green malt by replenishing with fresh acid solution.

These processes might be continued indefinitely were it not that, as was recognized in British patent specification No. 582,423, the lactic acid solution becomes contaminated with foreign and harmful organisms and as a result of the multiplication and growth of these there develop the formation of moulds and unpleasant stench, accompanied by a fall in the strength of the lactic acid solution. It has therefore been considered necessary to discard the replenished lactic acid solution after about ten steepings have been accomplished, and to start again with a fresh acid solution.

It is an object of the present invention to provide a process whereby the contamination of the acid solution is prevented, and the semi-continuity of the previous process may become more truly continuous, without deterioration of the acid solution, or of the final product. Other objects are to obtain better control over acidity, and so a better and more consistent final product, saving in cost of mashing materials, and longer effective life of acid.

According to the invention, a method of producing acidified malt comprises preparing a cereal mash, seeding with a pure culture of Lactobacilli, and fermenting the seeded mash to form an acid steep liquor; steeping a batch of germinated cereal in the acid steep liquor within a period (up to about 16 days) from the collection of said liquor from the mash tun and before any evidence of propagation of moulds has been observed therein; passing the steeped cereal to a kiln, returning the liquor to a storage vat, adding thereto further acid steep liquor not more than 16 days old to replace the acid absorbed by the steeped cereal; steeping a second batch of germinated cereal in the replenished acid steep liquor, passing said steeped batch to the kiln, and replenishing the liquor; and so continuing to steep and replenish with acid not more than 16 days old for as long as is required.

The culture employed for seeding the cereal mash is of a thermophilic Gram-positive strain, anod preferably is a culture predominantly of Lactobacillus Delbrückii.

Preferably the further acid steep liquor added to the storage vat at each replenishment amounts to approximately 20% of the volume of the acid steep liquor in the storage vat.

This further acid steep liquor is conveniently produced by preparing a further cereal mash which is seeded with a quantity of the first runnings of the preceding cereal mash.

In describing the invention it will be convenient first to discuss the bacteriological aspects.

Examination under the microscope of acid steep liquor used for about 10 steepings and, as stated in British patent specification No. 582,423, hitherto considered undesirable for further use, disclosed the presence of an excessive amount of yeast, bacilli other than Lactobacilli, moulds, and dead rod bacilli.

It is necessary to allow acidification of the mash to proceed under non-sterile conditions (i.e., at temperatures not exceeding 150° F.). The mash must therefore be seeded with a pure culture of Lactobacilli in sufficient amount to swamp any other micro-organisms present, thus permitting only lactic acidification to proceed. The strain Lactobacillus Delbrückii is a thermophilic bacillus, and this is therefore suitable for the temperatures obtaining in the mash. These temperatures are likely to kill non-thermophilic bacilli. It is very desirable to ensure a sufficiency of Lactobacilli to complete the conversion of the sugars to lactic acid.

The culture is prepared as follows:

At the end of a period of production of biological acid, a sample of the strongest acid is plated by streak culture on sweet wort-agar in Petri dishes by serial dilution technique and grown for 6 days. The various colonies are transferred to sterile sweet wort in test tubes by stab culturing and grown for 48 hours at 45–48° C.

Sub-cultures are then made into sterile sweet wort in further test tubes by loop transfer, and the residual cultures examined for pH value, microscopical examination and Gram stain test. Gram-positive rod bacilli producing lactic acid are retained and any other cultures developing are discarded. The retained cultures are grown for a further 48 hours at 45–48° C. and then sub-cultured into further test tubes of sterile sweet wort by loop transfer, checking the residual cultures as before to confirm the presence of Gram-positive rod bacilli. Any cultures containing other organisms, even if only in small proportions, are discarded, and the residual cultures grown on in sterile sweet wort to which calcium carbonate has been added. The cultures are built up in stages to a 4 litre volume, and tests on residual intermediate cultures are carried out by seeding sweet wort and after 14 days growth at laboratory room temperatures are testetd for pH value, Gram staining and lactic acid production, as a check on purity.

The final bulk of 4 litres is used for seeding the first mash, and the build-up from the test tube cultures to the large final cultures is adjusted to obtain the large final culture in a high state of activity at seeding of the first mash.

During the whole period of growth of the Lactobacilli, the same enviroment is used as in plant production of lactic acid, i.e., sweet wort.

A convenient procedure for the production of a full quantity mash is as follows.

The mash tun is charged with 12 cwts. of ground barley and 700 gallons of hot water, and the whole is heated to 95–97° C. for two hours by means of steam coils in the mash tun, in order to swell the starch granules. The mash is then cooled to 70° C. with 700 gallons of water, and 12 cwts. of ground malt are added. After mixing, the temperature is adjusted to 65° C., and maintained at that temperature for 20 hours. 4 hours after the ground malt has been admixed with the ground barley and water, a gravity is determined to ascertain the extent of saccharification that has taken place.

The mash is then cooled to 55° C. and the pure culture of Lactobacilli, prepared as described above, is added and well mixed in. The seeded mash is maintained at 55° C. for 24 hours.

The strong liquor, amounting to 900 gallons, is then drained off into the receiving vessel, and thence to the acidifying vat. A sample of the first runnings from the mash tun (i.e., before sparging takes place) is tested for gravity, pH value and titration value to pH 8.00, in order to ascertain the extent of acidification. The mash in the mash tun is then sparged wtih hot water at 55° C. and drained into the receiving vessel and thence to the acidifying vat. This sparging is performed in the mash tun three times in succession, the quantities being 700 gallons, 500 gallons, and 450 gallons respectively. The final collected volume in the acidifying vat is about 2500 gallons, approximately 900 gallons of which resulted from the initial draining of the strong malt extract liquor.

A sample of the total collected acid liquor (i.e., first drain and spargings) is tested for gravity, pH value and titration value to pH 8.00 in order to ascertain the extent of dilution and the residual fermentable matter.

Fermentation is now allowed to proceed in the acidifying vat for 6 to 7 days, temperature being maintained by steam coils at 55° C. until complete conversion of the carbohydrates to lactic acid has taken place. The acid liquor is then transferred to storage vats and maintained at 50° C., and is used for the production of acidified malt within 16 days of collection. A sample of the ferment 6 days after collection is tested for gravity, pH value and titration value, in order to ascertain the extent of fermentation and acid production.

The storage vats are arranged in a battery, according to the requirements of the maltings. For simplicity, there will be described a battery of two vats only, termed the acid steep storage vat and the make-up storage vat respectively. These are conveniently located side by side, and both are charged from the acidfying vat.

Simultaneously with the above-described operations, there proceeds the floor malting process whereby there is produced the malt for the acid steep tank. Barley is steeped in water for 48 hours, drained, and passed to the first couch bed, where it is retained at the optimum growing temperature (58–60° F.) and turned to promote aeration and so achieve uniform growth. On the fourth or fifth day it is sprinkled with a dilute acid solution at the rate of 2 to 4 gallons per quarter. This solution is made up of ⅓ by volume acid from the acidifying vat, and ⅔ water.

The sprouting barley is passed to the second and third couch beds, and standard floor malting practice is followed, the succession of steps taking from 8 to 12 days, according to local conditions. The malt is now known as green malt, and is ready for the acid steep.

Acid liquor is run from the acid steep storage vat to the acid steep tank, which is charged with green malt, and steeping takes place for 10 to 17 hours, dependent upon local conditions. During the steep, the malt takes up about 20% of the acid in the acid steep tank. Samples of the acid steep liquor are tested for gravity, pH value, and titration to pH 8.00, both before and after steeping, in order to ascertain the increase in gravity arising from the matters extracted from the green malt and the effect on the pH value and titration value. The effect of the acid steep upon the malt has already been discussed in British Patent No. 582,423. At the end of the steep, the malt is drained so as to remove as much liquor as possible before kilning. Normal kilning then ensues. It may be found that owing to the increased production of lactic acid from the mashes, the acidities of initial malts are higher than heretofore.

The acid steep liquor run off after the conclusion of steeping represents about 80% of the initial charge. This 80% is returned to the acid steep storage vat, and to this is added the 20% difference from the make-up storage vat. The acid steep storage vat is then raised by steam coils to a temperature of 50° C., and is ready to charge the acid steep tank for the next steep. Further batches of green malt coming forward are steeped and kilned as hereinbefore described, and after each steep the residual acid steep liquor (that is 80% of the steep charge) is run back to the acid steep storage vat and replenished by 20% addition from the make-up storage vat.

The process so far described may be regarded as truly continuous so long as the battery of storage vats can meet the demands of the acid steep tank, but the storage vats themselves must be replenished with further acid steep liquor by means of further mashes. For the purpose of seeding the second mash, about 6 gallons of the strong liquor (first runnings) of the first mash are run off into a separate vessel and then admixed with the second mash, so as to hasten the acidification thereof. In other respects, the procedure for the second mash follows that described above for the first mash. Subsequent mashes are each seeded by the 6 gallons of strong liquor from the preceding mash retained for the purpose.

Hitherto, as explained in British Patent No. 582,423, it had been considered that the acid steep liquor must be discarded after 10 steeps, because of the growth of undesirable micro-organisms. It has been found that with the process as hereinbefore described it has been possible to employ the liquor for as many as 58 steeps, without any deterioration in the flavour or aroma of the wort. Since this represents an entire season's working, it will be clear that the process is as truly continuous as can be expected.

I claim:

1. A continuous method of producing acidified malt which comprises preparing a cereal mash, seeding said mash with a culture containing predominantly thermophilic Gram positive strain of Lactobacilli at a temperature not exceeding 65° C., fermenting said mash whereby an acid steep liquor containing lactic acid is formed, introducing a first charge of germinated cereal and said acid steep liquor into an acid steeping zone, the acid steep liquor employed at no time being more than 16 days old from the time of collection of said acid steeping liquor from said cereal mash and before any evidence of propagation of moulds appear, separating the first charge of acid steeped germinated cereal from the residual acid steep liquor, conveying said first charge of acid steeped germinated cereal to a drying zone, conveying the first residual acid steep liquor to a storage zone maintained at a temperature of about 45–50° C., adding to said first residual acid steep liquor additional fresh acid steep liquor which at no time is more than 16 days old from the time of collection of said acid steeping liquor from said cereal mash and in which there is no evidence of mould propagation, whereby the acid absorbed by the first charge of germinated cereal is replenished, steeping a second charge of germinated cereal in the replenished acid steep liquor, separating said second charge of acid steep germinated cereal from a second residual acid steeping liquor, conveying said second charge of acid steeped germinated cereal to a drying zone, and replenishing said second residual acid steeping liquor with said acid steeping liquor which at no time is more than 16 days old from the time of collection of said acid steeping liquor from said cereal mash and in which there is no evidence of mould propagation.

2. A method as claimed in claim 1, wherein the culture employed for seeding the cereal mash is predominantly of Lactobacillus Delbrückii.

3. A method as claimed in claim 1, wherein the further acid steep liquor added to the storage zone at each replenishment amounts to approximately 20% of the volume of the acid steep liquor in said storage zone.

4. A method as claimed in claim 1, wherein the further acid steep liquor is produced by preparing a further cereal mash and seeding said further mash with a quantity of the first runnings of the preceding cereal mash.

References Cited in the file of this patent

UNITED STATES PATENTS

| 1,023,418 | Wahl | Apr. 16, 1912 |
| 1,068,028 | Wahl | July 22, 1913 |
| 1,538,516 | Funk | May 19, 1925 |

FOREIGN PATENTS

| 582,423 | Great Britain | of 1943 |